United States Patent

[11] 3,580,642

[72] Inventor Ernest J. Nagy
 Munster, Ind.
[21] Appl. No. 805,500
[22] Filed Mar. 10, 1969
[45] Patented May 25, 1971
[73] Assignee Pullman Incorporated
 Chicago, Ill.

[54] COMBINATION GRAVITY AND PNEUMATIC GATE ARRANGEMENT FOR HOPPERS
3 Claims, 7 Drawing Figs.
[52] U.S. Cl. .................................................. 302/52
[51] Int. Cl. .......................................... B65g 53/40
[50] Field of Search .......................................... 302/52

[56] References Cited
UNITED STATES PATENTS
| | | | |
|---|---|---|---|
| 3,393,017 | 7/1968 | Smith | 302/52 |
| 3,445,140 | 5/1969 | Nagy | 302/52 |
| 3,446,538 | 5/1969 | Danielson | 302/52 |
| 3,451,726 | 6/1969 | Nagy | 302/52 |

Primary Examiner—Andres H. Nielsen
Attorneys—Hilmond O. Vogel and Wayne Morris Russell ABSTRACT: A hopper discharge arrangement includes a combination of a gravity gate and a pneumatic gate which may be positioned in closed relation underneath the discharge end of a hopper and which may be moved to one side of the discharge end for effecting gravity discharge of materials contained within the hopper. A manually operated rack and pinion arrangement is provided on the gravity gate which cooperates to effect sliding movement thereof. The pneumatic gate includes a dish-shaped pan having a pneumatic outlet connected thereto and the said gravity gate and pneumatic gate may be interconnected by means of an interlocking device to provide for conjoint movement. The interlock device is effective to lock the gravity and pneumatic gates in a closed position or together for simultaneous movement. The interlock device also may be readily disengaged to permit sole movement of the gravity gate to an open position whereby the pneumatic gate remains in a pneumatic discharge position underneath the discharge end of the hopper.

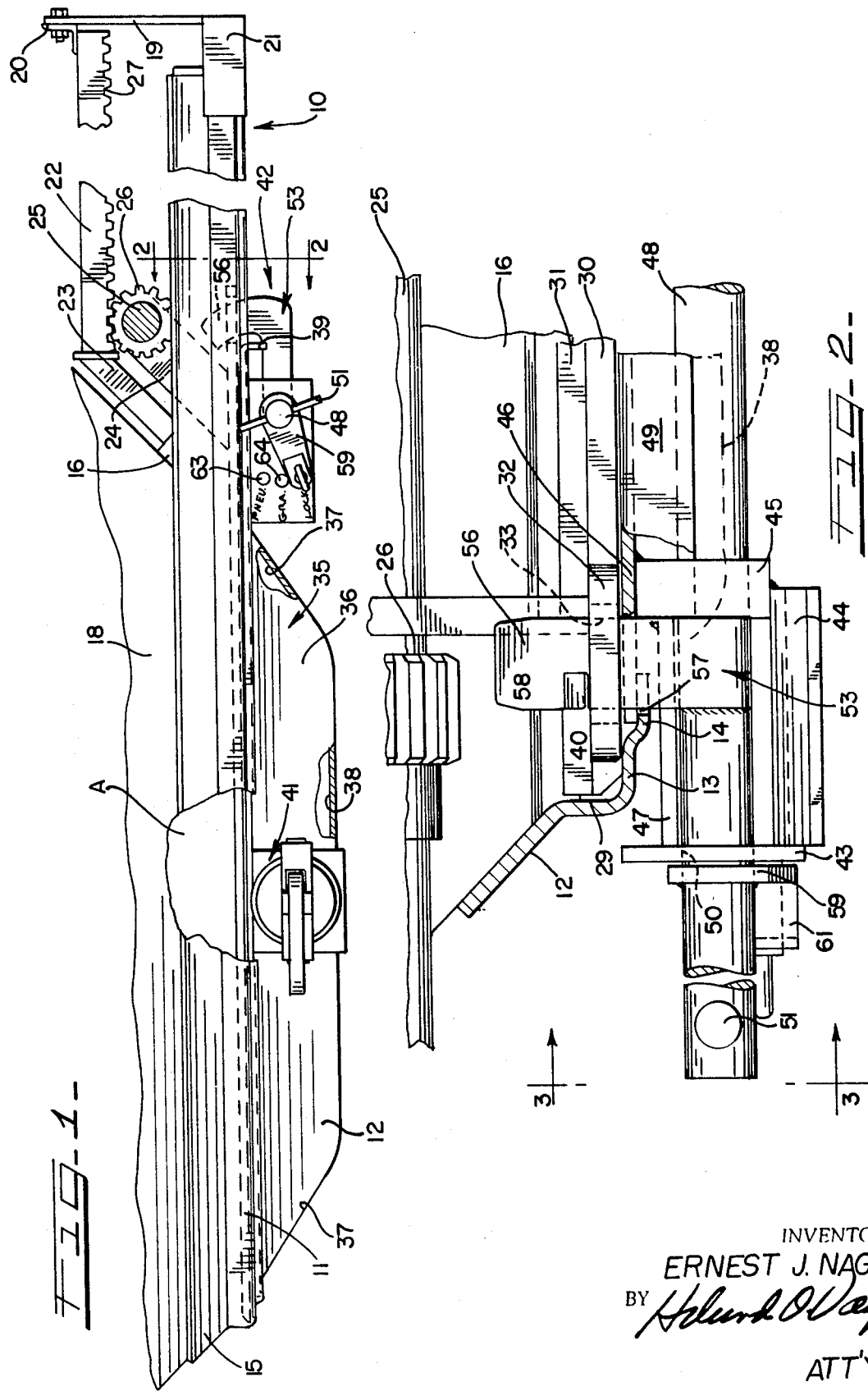

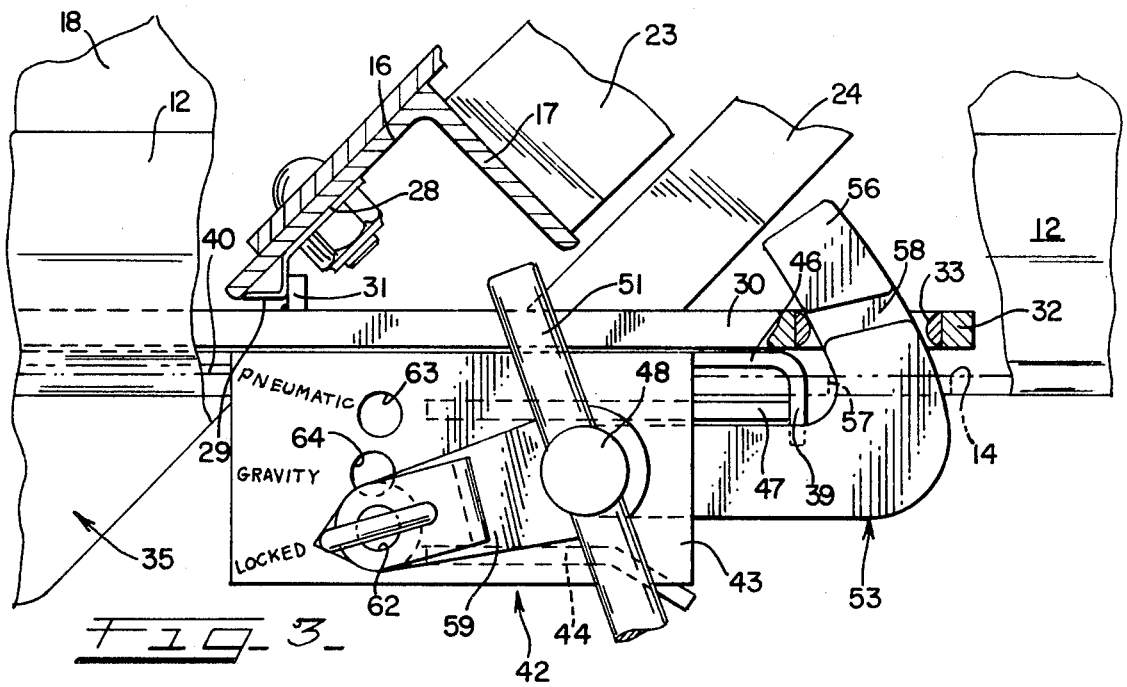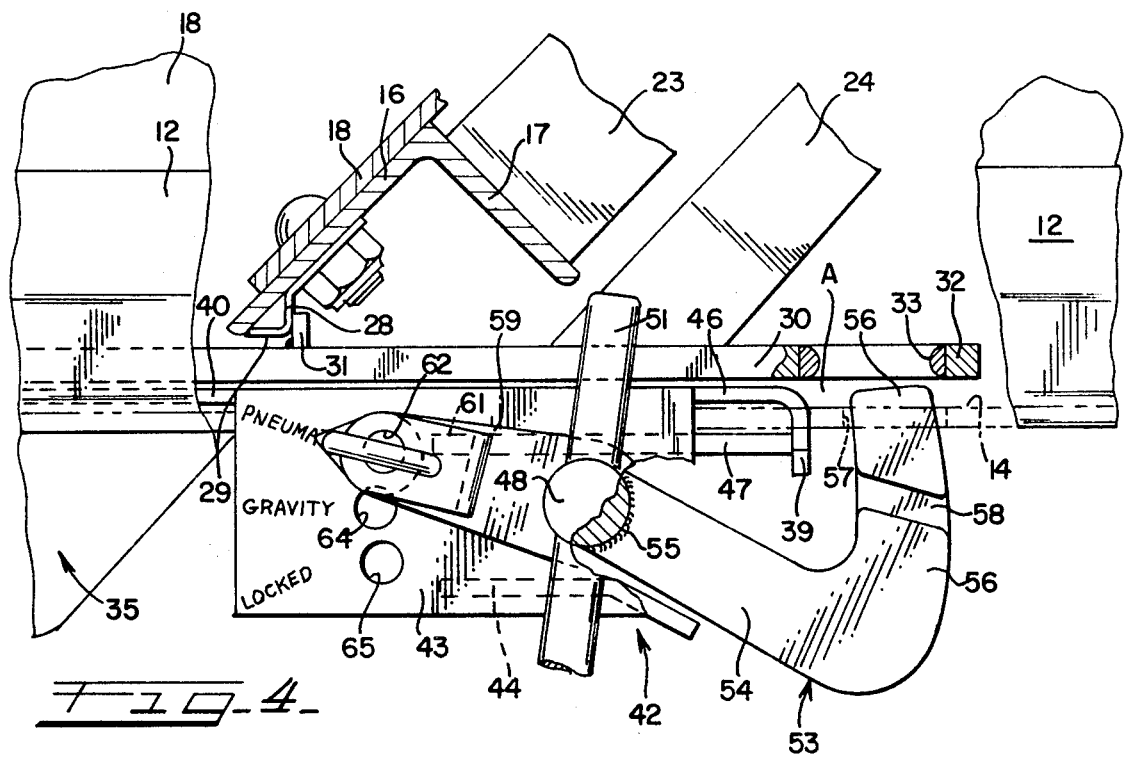

INVENTOR.
ERNEST J. NAGY

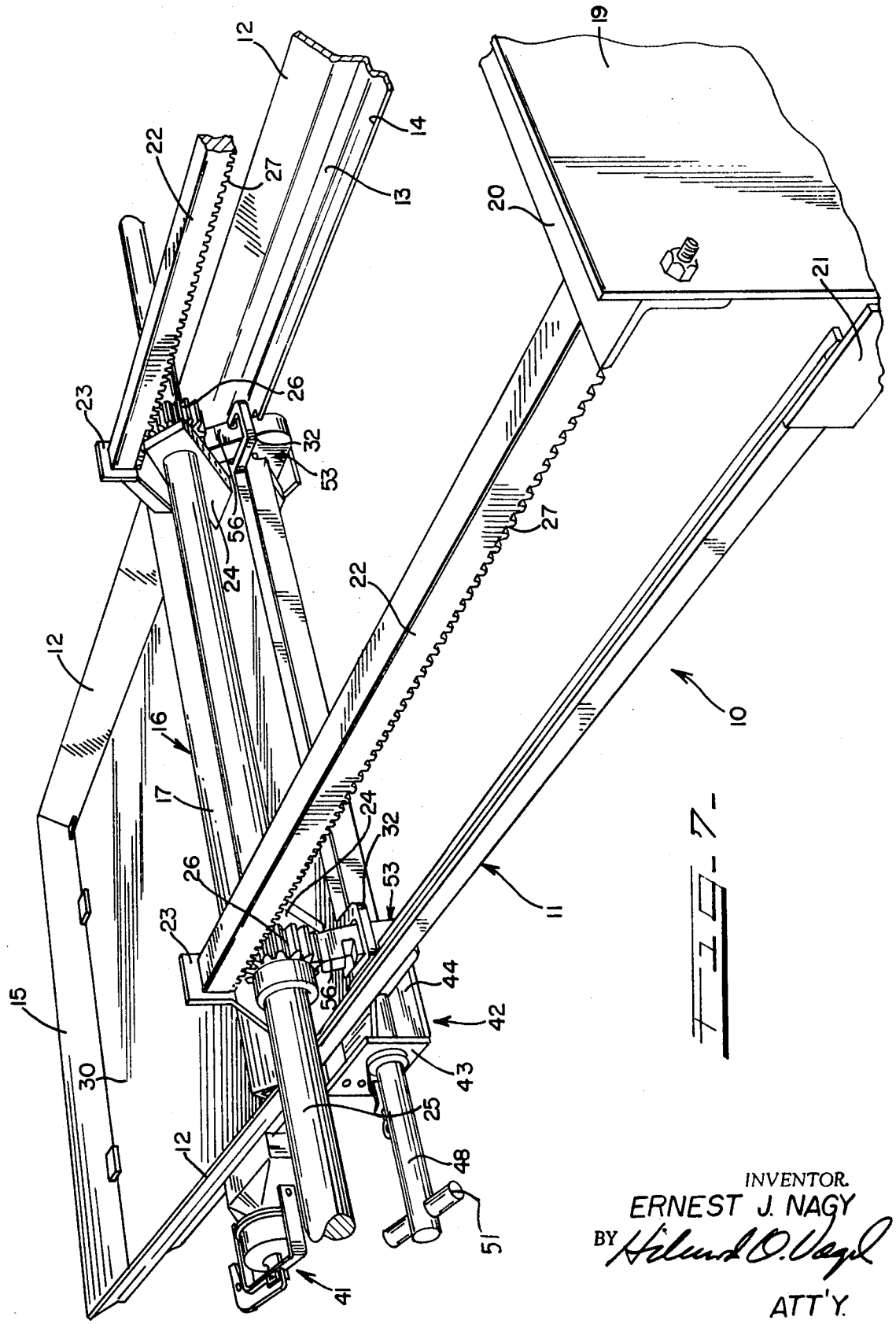

COMBINATION GRAVITY AND PNEUMATIC GATE ARRANGEMENT FOR HOPPERS

SUMMARY

The present invention is concerned with a combination gravity and pneumatic gate wherein the gates may be interconnected with each other to provide for conjoint or simultaneous movement initiated by a single rack and pinion arrangement connected to the gravity gate. It is a prime object of the invention to provide an improved interlocking mechanism for interconnecting the gates including a locking means whereby the gates may be secured in a closed position during transit.

BRIEF DESCRIPTION OF THE DRAWINGS

FIG. 1 is a side elevational view of a combination gravity and pneumatic gate arrangement;

FIG. 2 is a detailed cross-sectional view taken substantially along the line 2–2 of FIG. 1;

FIG. 3 is a side elevational view taken substantially along the line 3–3 of FIG. 2;

FIG. 4 is a side elevational view similar to FIG. 3 showing another position of an interlocking mechanism;

FIG. 7 is a perspective view of the improved arrangement.

DETAILED DESCRIPTION

Figure 5:
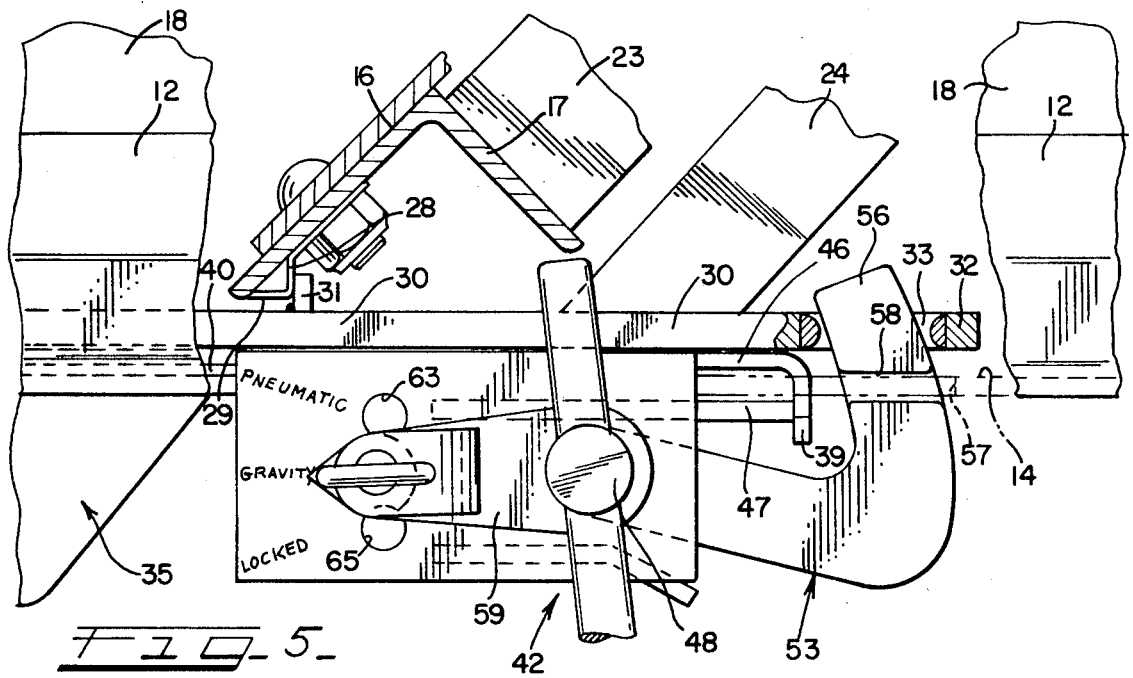
FIG. 5 is a view similar to FIG. 4 showing a still other position of an interlocking mechanism.

Referring particularly to FIGS. 1 and 7 a combination gravity and pneumatic discharge gate arrangement is indicated by the reference character 10. The arrangement 10 comprises a frame 11 having horizontally extending sidewalls 12 which are provided, as best shown in FIGS. 2 and 7, with vertically offset horizontally extending ledges 13 and 14. The frame 11 also includes horizontally spaced end walls 15 and 16 which with the sidewalls 12 form a discharge opening A which is disposed beneath the discharge end of a hopper which is adapted to be disposed beneath the discharge end of a hopper. The end wall 16 is of angle-shaped construction as best shown in FIGS. 3 and 4 and includes a downwardly inclined flange 17. As best shown in FIG. 1 sloping hopper sides are designated at 18 and, as shown in FIGS. 3 and 4, are suitably connected to the end wall 16. The walls 18 are also similarly connected to the sidewalls 12 and end wall 15, thereby providing a suitable lower discharge portion for the hopper which may contain material to be discharged. The hopper structure is generally of conventional construction such as may be found in a railway hopper car.

The sidewalls 12 as best shown in FIGS. 1 and 7 extend laterally from the discharge opening a distance slightly more than the width of said opening and are interconnected by means of a rack supporting frame 19 suitably connected to the sides 12 by means of brackets 21. The supporting frame 19 is provided at its upper end with a transversely extending angle member 20 to which are attached a pair of rack bars 22. The rack bars 22 have connected thereto at their forward ends brackets 23 which are suitably supported on the flange 17 of the end wall 16. A pair of upwardly extending flat plates or brackets 24 are fixedly secured at their lower ends to a gravity gate 30 and support for rotation thereon an operating shaft 25. The operating shaft 25 is typical of a rack and pinion gate operating arrangement and includes suitable operating heads (not shown) which may be turned by a tool in the hands of an operator. The operating rod 25 has supported thereon for rotation therewith a pair of pinions 26 which are in engagement with rack teeth 27 provided on the racks 22.

As best shown in FIGS. 3, 4 and 5 a transversely extending bracket 28 is connected to the lower edge of the end wall 16 and provides openings 29 with the ledges 14 through which the gate 30 slides between open and closed positions. The gate 30 is provided with a transversely extending stop strip 31 which in the closed position as shown in FIGS. 3, 4 and 5 closes the openings 29. The gate 30 is also provided as best shown in FIG. 7 with a pair of rearwardly extending ears 32 provided with vertical openings 33.

As best shown in FIG. 1 a pneumatic gate of generally conventional dish-shaped construction is designated at 35. The gate 35 comprises a pair of downwardly converging sidewalls 36 and downwardly converging end walls 37. A bottom wall 38 is best indicated in FIG. 1. The end wall 37, as best shown in FIGS. 3 and 4, is also provided with a horizontally rearwardly extending plate portion 46 which is provided at its end with a downwardly extending rear flange 39. As shown in FIG. 2 the horizontal plate 46 is also provided with marginal edges 40 which are seated in sliding engagement upon the ledge 14 beneath the gravity gate 30. The pneumatic gate 35 is provided with a suitable conventional pneumatic outlet 41 which may be attached to a source of vacuum for withdrawing material from the hopper as desired.

An interlocking device 42 for interconnecting the gates 30 and 35 is generally designated by the reference character 42. The device 42 includes a vertical plate 43 suitably connected to a lower horizontal plate 44, as best shown in FIG. 2, which is connected to a vertical beam member 45 in turn suitably welded to the underneath side of the flat plate 46. The construction shown in FIG. 2 is representative of both sides of the arrangement since the gate arrangement is symmetrical.

Figure 6:
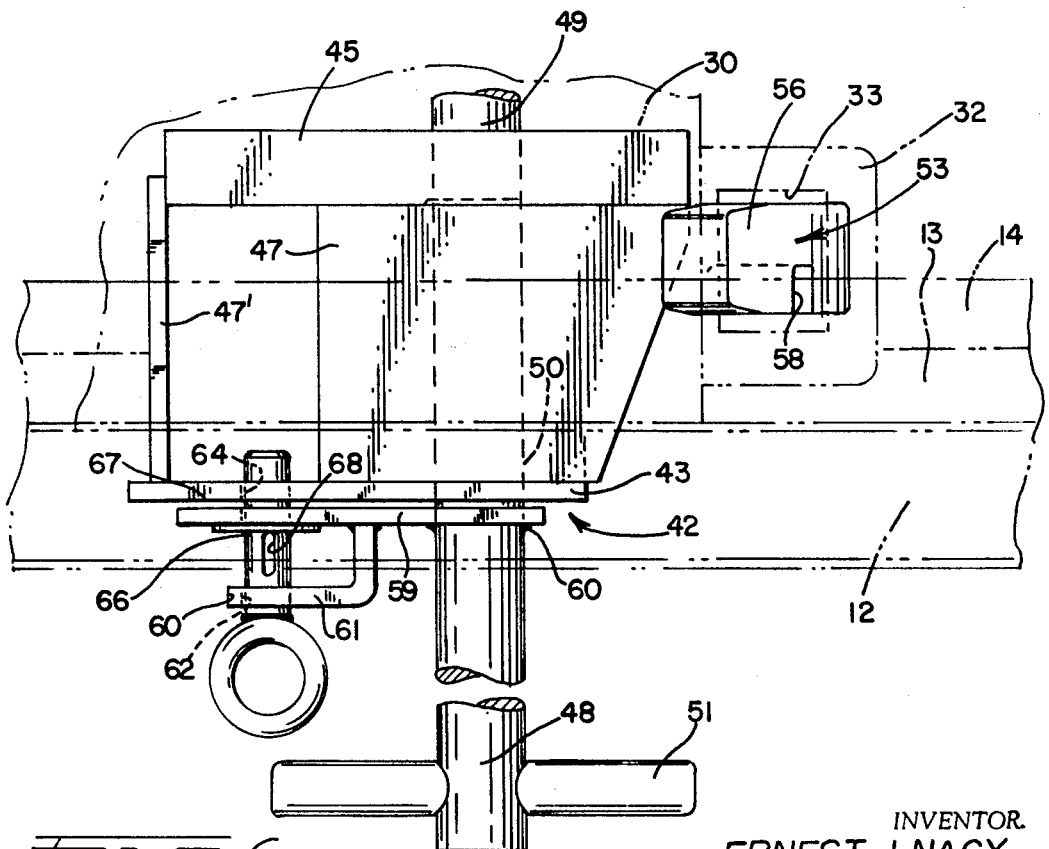
FIG. 6 is a plan view of a detailed structure shown in FIG. 5.

An upper plate 47 as best shown in FIG. 6 connects the beam 45 and the plate 43 and a vertical rear plate 47' suitably connects the beam 45 and the plate 43. Thus an interlocking device 42 is rigidly connected to the underneath sides of each of the flat plate portions 46 of the pneumatic gate 35.

The rotatable rod 48 is rotatable in openings 49 provided in the beam member 45 and in openings 50 provided in the vertical plate 43. An operator's handle 51 is used to rotate the rod 48.

As best shown in FIGS. 2 and 7 a pair of latch elements 53 are suitably connected to horizontally spaced portions of the rod 48. Each latch element includes an arm 54 welded as indicated at 55 to the rod 48. The end of the arm 54 is provided with a hook portion 56 adapted to be pivoted with the rod 48 through openings 57 as best shown in FIGS. 2, 3 and 4 provided in the horizontal ledge 14. The sides of the hook portion are also provided with a slot 58 having a height of greater dimension than the ledge 14.

A pair of indicator and lock elements 59 are also secured to the rod 48 for rotation therewith and are disposed immediately outwardly of the plate 43. The elements 59 are suitably welded as indicated at 60 to the rod 48. An angle bracket 61 is connected to an end of the element 59 and includes as best shown in FIG. 6 an opening 62 which is adapted to be placed into registry with any one of openings 63, 64 and 65 provided in the plate 43. The pin 66 is inserted through the opening 62 and through an opening 67 provided in the lock element 59 and extends through either of the openings 63, 64 and 65 dependent upon the position to which the lock element 59 is rotated. The pin 66 is also provided with a car seal slot 68 which in the locked position may have a conventional car seal inserted therein to prevent withdrawal of the pin. Thus the indicator and lock element 59 is securely locked as shown in 53 preventing opening of the gates 30 and 35.

THE OPERATION

In FIG. 3 the element 59 is in the locked position and the latch element 53 has the hook portion 56 projecting through the opening 57 and the opening 33 in the gravity gate. In this position both gates 30 and 35 are in the closed position.

In the event that it is desired now to move the gravity gate out of the way from beneath the discharge end of the hopper the indicator 59 and element 53 are moved into the position shown in FIG. 4 wherein the hook 56 is now out of engagement with respect to the opening 33 and upon rotation of the rack and pinion arrangement the gate may be moved to an out of the way position to one side of the discharge end along the ledges 13 and toward the rack supporting frame 19. The pneumatic gate 35 is now in position to receive material from the hopper which is discharged through the pneumatic outlet 41 in conventional fashion.

In the event that it is desired to discharge material from the hopper by means of gravity the hook portion 56 as best shown in FIG. 5 is in engagement with the gate 30 by means of its extension through the opening 33. The hook 56 now has its slot 58 disposed in alignment with the ledge 14 and as the gates 30 and 35 are moved conjointly from beneath the discharge end of the hopper the slot 58 travels along the ledge 14 which is now disposed in said slot. Thus it is apparent that with only a very limited pivotal movement of the hook portion proper positioning of the slot 58 relative to the ledge 14 is achieved so that movement of both gates is permitted to the out of the way position whereupon gravity discharge may be effected. In each position of the element 59 the pin 66 is inserted in the respective adjacent opening to lock the latch element 53 in its position.

Thus it is clear that an effective interlocking device has been disclosed for interlocking the gates for conjoint movement, for locking the gates in position on the frame, and for releasing the said gates from said conjoint movement to effectuate the desired positioning of the gates. The interlocking device also includes an indicating and locking mechanism which facilitates the choice of positions desired and the locking of the same in said positions.

I claim:

1. A combination pneumatic and gravity gate arrangement for the discharge end of a hopper comprising:

a frame including horizontally spaced vertical walls and end walls interconnected and defining a discharge opening disposed in registry with said discharge end, a gravity gate and a pneumatic gate, one disposed below the other, each being movable on said frame from an open position to a closed position underneath said discharge opening, said pneumatic gate including pneumatic discharge means in the closed position being adapted to discharge material from said hopper, means for moving said gates individually and conjointly, an interlocking device including a support connected to said pneumatic gate, an actuating rod rotatably connected to said support, a latch member connected to said rod for rotation therewith, an indicator and lock element connected to said rod for rotation therewith, said latch member being rotatable to interlock said gates with said frame against movement in the closed position, and for conjoint movement, to the open position to permit gravity discharge, said latch being positionable out of engagement with said gravity gate which is movable to the open position and said pneumatic gate remains in the closed position, said indicator and lock element providing visual indication of the position of said latch element, locking means on said indicator and lock element movable into engagement with said support for locking said latch member against movement in any one of its positions, said latch member including an arm having at one end a hook adapted to engage said gravity gate during the interlock position, said hook engaging aligned openings respectively in said gravity gate and said frame during said interlock position, said frame having longitudinally extending ledges projecting horizontally inwardly from said vertical walls for supporting said pneumatic gate, said hook including a slot on one side thereof which is slidingly engaged by a marginal edge portion of one ledge, said hook being movable out of said opening in said gravity gate and retained in said opening of said frame whereby said pneumatic gate is locked in said closed position.

2. The invention in accordance with claim 1, said locking means comprising a pin movable through an opening in said indicator and lock element and into one of a plurality of openings provided on said support.

3. The invention in accordance with claim 2, said locking means including car seal means.